P. A. WHITNEY.
SHEET-METAL ROLLER-SEAMING MACHINES.
No. 195,066.  Patented Sept. 11, 1877.
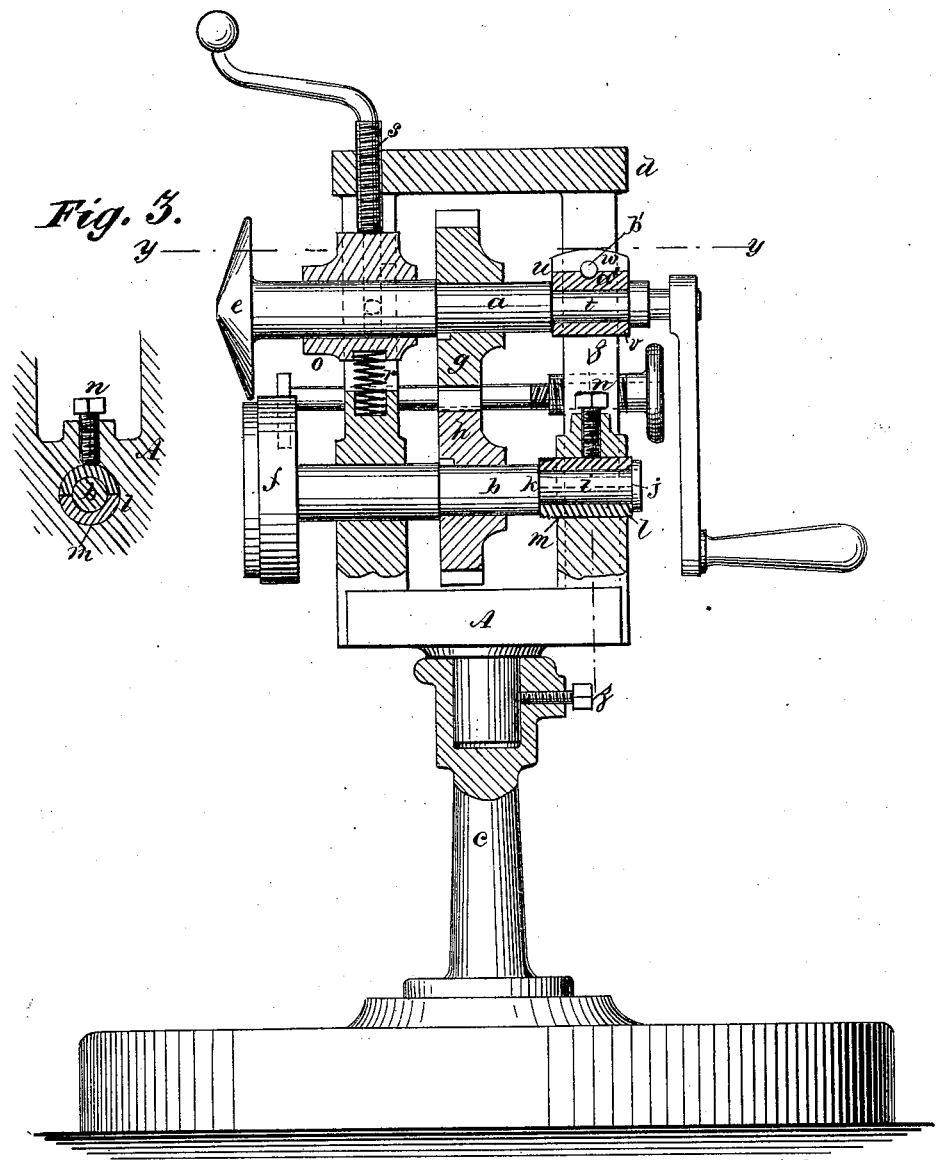
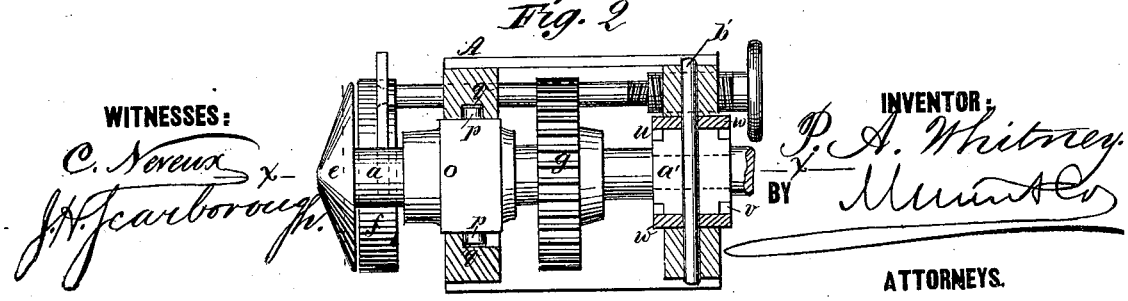
WITNESSES:
INVENTOR:
P. A. Whitney
BY
ATTORNEYS.

UNITED STATES PATENT OFFICE.

PARDON A. WHITNEY, OF SOUTHINGTON, CONNECTICUT.

IMPROVEMENT IN SHEET-METAL ROLLER-SEAMING MACHINES.

Specification forming part of Letters Patent No. 195,066, dated September 11, 1877; application filed July 17, 1877.

*To all whom it may concern:*

Be it known that I, PARDON A. WHITNEY, of Southington, in the county of Hartford and State of Connecticut, have invented a new and Improved Sheet-Metal-Burring Machine, of which the following is a specification:

Figure 1 is a side elevation, in partial section, on line $x\,x$ in Fig. 2. Fig. 2 is a horizontal section on line $y\,y$ in Fig. 1. Fig. 3 is a detail view of one of the journal-boxes, in section, on line $z\,z$ in Fig. 1.

Similar letters of reference indicate corresponding parts.

The invention relates to the construction of the shaft-journals and journal-boxes, as hereinafter described.

The shafts $a\,b$ are of a uniform diameter from the burrs $e\,f$ to the gears $g\,h$, so that they may slide through their journal-boxes. The lower shaft $b$ is journaled in a fixed bearing at the front of the machine, and is turned down at $i$, forming shoulders $j\,k$. Upon the portion $i$, and between the said shoulders, a cylindrical box, $l$, is placed, which is split longitudinally, and is placed in a hole, $m$, in the frame A, where it is clamped by the screw $n$. When the screw $n$ is loosened, the box $l$, together with the shaft $b$, may be moved longitudinally within certain limits.

The front box $o$ of the shaft $a$ is solid, and is fitted to a rectangular opening at the front of the frame A, and is provided with projections $p$, that are fitted to grooves $q$ formed in the frame A at the sides of the rectangular opening. A spiral spring, $r$, bears this box up, and the screw $s$ passes through the cap $d$ and bears upon the top of the box.

The shaft $a$ is turned down at $t$, and fitted to a box, $u$, placed in an opening in the back of the frame, which box consists of a lower part, $v$, having ears $w$, and a cap, $a'$, that is fitted between the ears $w$, and is held in place by a pin, $b'$, that passes through the sides of the frame A and forms a pivot, upon which the box swings.

Having thus described my invention, I claim as new and desire to secure by Letters Patent—

1. In a sheet-metal-burring machine, the combination of the shaft $b$, having the reduced portion $i$ between the shoulders $j\,k$, the cylindrical box $l$, made in two parts, the set-screw $n$, and the frame having the hole $m$, to receive and permit adjustment and removal of the parts $b\,l$, as shown and described.

2. The box $u$, consisting of the part $v$, having ears $w$, the cap $a'$, and the pin $b'$, in combination with the frame A and shaft $a$, substantially as shown and described.

PARDON A. WHITNEY.

Witnesses:
SOL. FINCH,
M. H. HOLCOMB.